United States Patent
Legner

(10) Patent No.: US 12,392,114 B1
(45) Date of Patent: Aug. 19, 2025

(54) METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

(71) Applicant: ZF FRIEDRICHSHAFEN AG, Friedrichshafen (DE)

(72) Inventor: Jürgen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 18/992,211

(22) PCT Filed: Jul. 11, 2023

(86) PCT No.: PCT/EP2023/069128
§ 371 (c)(1),
(2) Date: Jan. 8, 2025

(87) PCT Pub. No.: WO2024/013138
PCT Pub. Date: Jan. 18, 2024

(30) Foreign Application Priority Data

Jul. 14, 2022 (DE) ...................... 10 2022 207 184.0

(51) Int. Cl.
*E02F 9/26* (2006.01)
*B60L 3/00* (2019.01)
*E02F 9/20* (2006.01)

(52) U.S. Cl.
CPC ............ *E02F 9/267* (2013.01); *B60L 3/0061* (2013.01); *E02F 9/207* (2013.01); *B60L 2240/421* (2013.01)

(58) Field of Classification Search
CPC ......... E02F 9/267; E02F 9/207; B60L 3/0061; B60L 2240/421
See application file for complete search history.

(56) References Cited

U.S. PATENT DOCUMENTS 5,686,839 A * 11/1997 Takagi .................... B60L 7/003
324/510
5,929,594 A * 7/1999 Nonobe .............. H01M 16/006
320/132

(Continued)

FOREIGN PATENT DOCUMENTS

DE 102012206147 A1 10/2013
DE 102018203623 A1 9/2019

(Continued)

*Primary Examiner* — Tyler J Lee
(74) *Attorney, Agent, or Firm* — LEYDIG, VOIT & MAYER, LTD.

(57) ABSTRACT

A method for operating an electrified drive train including a drive motor, inverter, and accelerator pedal. The drive motor provides a motor speed and torque according to a position of the accelerator pedal. The inverter detects a motor mode when a motor torque greater than a threshold motor torque is provided. The inverter detects a generator mode when a generator torque greater than a threshold generator torque is provided. The inverter detects a torque-free state of the drive motor when the generator torque is less than the threshold generator torque and the motor torque is less than the threshold motor torque. Each position of the accelerator pedal is assigned a respective maximum motor speed, and a motor fault is detected when a motor speed above an assigned speed is detected and, at the same time, a motor mode of the drive motor is detected.

7 Claims, 2 Drawing Sheets

(56) References Cited

U.S. PATENT DOCUMENTS

| | | | |
|---|---|---|---|
| 9,333,844 | B2 | 5/2016 | Mecks et al. |
| 2021/0025137 | A1 | 1/2021 | Legner |
| 2021/0025139 | A1 | 1/2021 | Legner |

FOREIGN PATENT DOCUMENTS

| | | |
|---|---|---|
| DE | 102020201497 A1 | 8/2021 |
| EP | 0962597 A2 | 12/1999 |
| JP | 2016014264 A | 1/2016 |

* cited by examiner

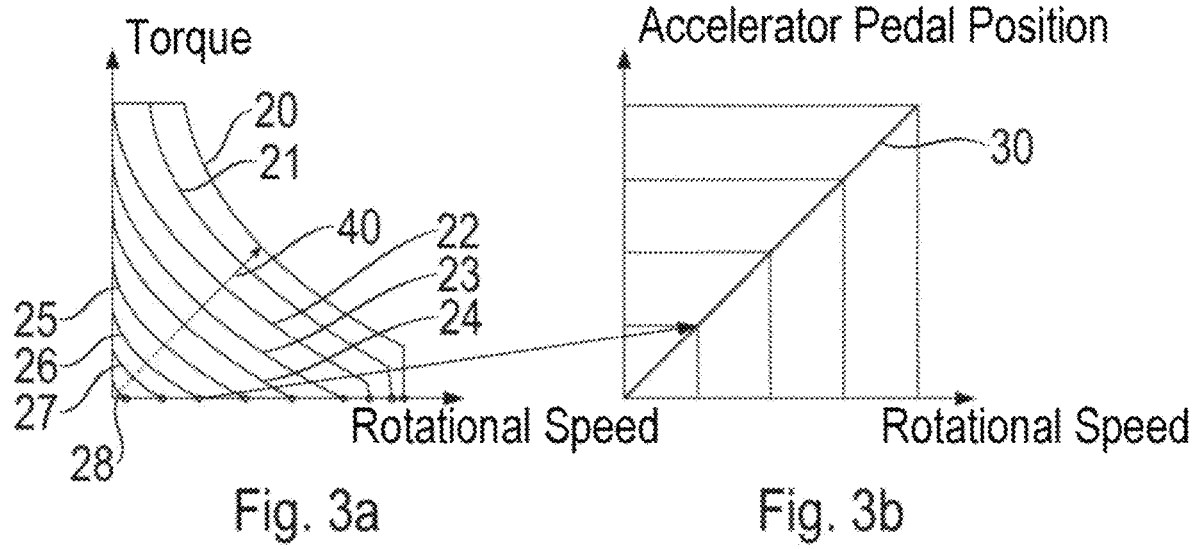
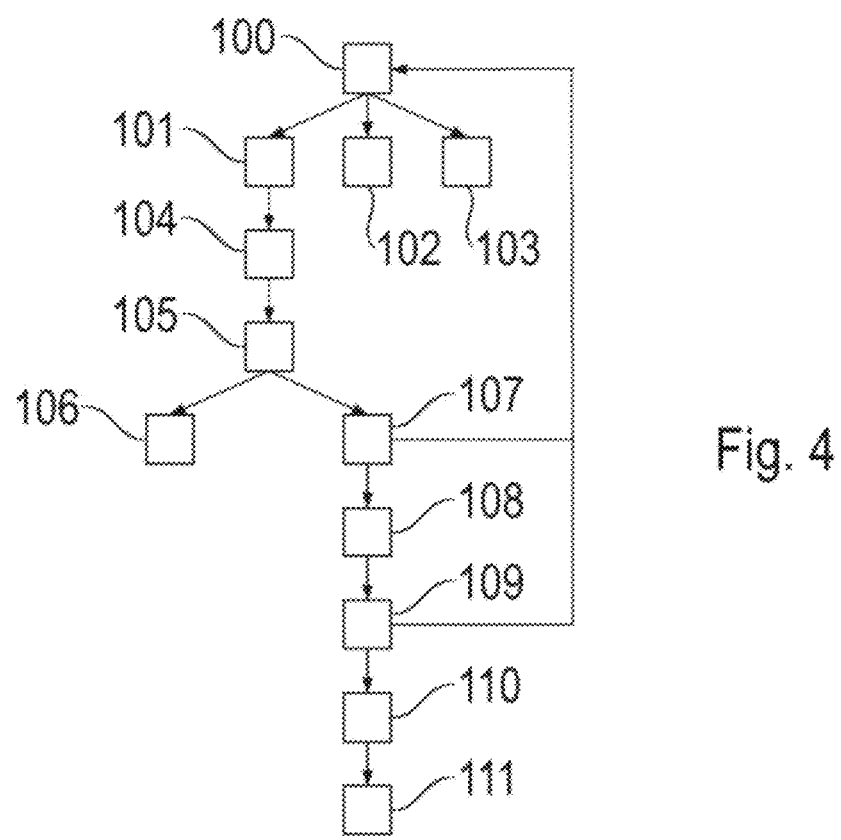

METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

CROSS REFERENCE TO RELATED APPLICATIONS

This application is a U.S. National Phase application under 35 U.S.C. § 371 of International Application No. PCT/EP2023/069128, filed on Jul. 11, 2023, and claims benefit to German Patent Application No. DE 10 2022 207 184.0, filed on Jul. 14, 2022. The International Application was published in German on Jan. 18, 2024 as WO 2024/013138 A1 under PCT Article 21 (2).

FIELD

The present invention relates to a method for operating an electrified drive train for a working machine, an electrified drive train for a working machine, as well as a corresponding working machine.

BACKGROUND

Various kinds of electrically driven working machines, such as wheel loaders, compact loaders, telescopic loaders, dumpers, or diggers are known from the prior art. These working machines have in common that they are either purely electrically driven, i.e., they only have an electric battery or a fuel cell as an energy storage device, or they are diesel-electrically driven, which means that the required energy is provided by a diesel-powered generator and, where applicable, by an electrical buffer storage device, for example a suitably dimensioned capacitor or a relatively small battery. However, in all of the cases mentioned, the mechanical power required for operating the working machine is provided by one or more electric motors.

In this connection, EP 0962 597 A2 describes a battery-operated working machine which has two electric motors for the travel drive and an additional electric motor for the work drive.

The still unpublished patent application DE 102020201497.3 of the Applicant discloses a method for operating an electrified drive train for a working machine. A downhill travel of the working machine can be detected using means for detecting an incline in conjunction with means for detecting a travel of the working machine. If the work machine exceeds a threshold speed while traveling downhill, the electric motor is switched into a regenerative mode in order to prevent the working machine from accelerating further as a result of the downhill force.

Also known to the Applicant are methods for monitoring an electric drive motor of a working machine where the torque provided by the drive motor is monitored. In this way, it is possible, for example, to detect accidental moving off, moving off in the wrong direction, unwanted acceleration, unwanted deceleration, or a time delay in executing the driver's command.

However, the known electric drive trains for working machines are disadvantageous in that-depending on the specific design of the inverter used for controlling the electric motor-they are unable to reliably determine the torque provided by the electric motor at each operating point. Therefore, in such a case, it is not possible to compare an actual torque to a desired torque in order to detect a possible motor fault. Thus, monitoring of the electric motor during operation is only possible to a limited extent.

SUMMARY

In an embodiment, the present disclosure provides a method for operating an electrified drive train for a working machine, the drive train including an electric drive motor, an inverter associated with the electric drive motor, and an accelerator pedal. The drive motor provides a motor speed and a motor torque according to a position of the accelerator pedal. The inverter detects a motor mode of the drive motor when a motor torque greater than a threshold motor torque is provided. The inverter detects a generator mode of the drive motor when a generator torque greater than a threshold generator torque is provided. The inverter detects a torque-free state of the drive motor when the generator torque is less than the threshold generator torque and the motor torque is less than the threshold motor torque. Each position of the accelerator pedal is assigned a respective maximum motor speed, and a motor fault is detected when a motor speed above an assigned speed is detected and, at the same time, a motor mode of the drive motor is detected.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 3a and 3b illustrate a series of maximum motor torques as characteristic curves as a function of a motor speed of the drive motor for different accelerator pedal positions; and FIG. 4 illustrates, in the form of a flow diagram, an embodiment of a method according to the present disclosure for operating an electrified drive train for a working machine.

DETAILED DESCRIPTION

Figure 1:
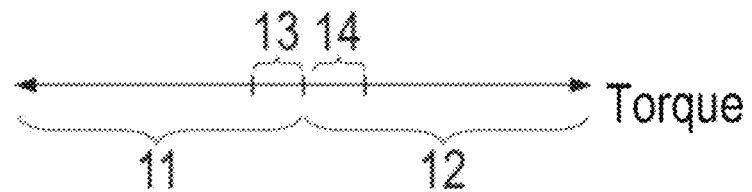
FIG. 1 schematically shows, on a torque axis, a generator torque of a drive motor, a motor torque of the drive motor, as well as a threshold generator torque and a threshold motor torque.

In an embodiment, the present disclosure provides an improved method for operating an electrified drive train for a working machine.

The present disclosure relates to a method for operating an electrified drive train for a working machine; the drive train including an electric drive motor, an inverter associated with the electric drive motor, and an accelerator pedal; the drive motor providing a motor speed and a motor torque according to a position of the accelerator pedal; the inverter detecting a motor mode of the drive motor when a motor torque greater than a threshold motor torque is provided; the inverter detecting a generator mode of the drive motor when a generator torque greater than a threshold generator torque is provided; and the inverter detecting a torque-free state of the drive motor when the generator torque is less than the threshold generator torque and the motor torque is less than the threshold motor torque. The method according to the present disclosure is characterized in that each position of the accelerator pedal is assigned a maximum motor speed, and in that a motor fault is detected when a motor speed above an assigned speed is detected and, at the same time, a motor mode of the drive motor is detected.

Thus, the present disclosure describes a method that can be used to operate an electrified drive train. The drive train is suitable for driving a working machine. Since working machines are generally operated under high drive loads most of the time and in particular also have to provide relatively high performance in absolute terms, the drive train according to the present disclosure differs in terms of design from, for example, a passenger car drive train, which is typically operated in a load range of 5% to 10% of the maximum power and in particular provides relatively low absolute performance.

The drive train includes an electric drive motor, an inverter associated with the electric drive motor, and an accelerator pedal.

Advantageously, the drive train can also include further components, such as a gearbox, additional electric motors, an electric battery storage device, and drivable wheels of the working machine.

The electric drive motor can be designed, for example, as a synchronous or asynchronous motor, in particular as a three-phase synchronous or asynchronous motor.

The inverter associated with the drive motor is advantageously designed to control the drive motor through suitable energization, in particular to control a speed and a torque of the drive motor.

The motor speed and the motor torque together represent a drive power.

The inverter is further configured to detect whether the drive motor provides a motor torque that is above a threshold motor torque and to detect whether the drive motor provides a generator torque that is above a threshold generator torque. In this connection, it is preferred to consider the magnitudes of the generator torque and the motor torque. An equivalent and functionally similar solution would be to consider the actual values of the generator torque and the motor torque, the threshold generator torque and the threshold motor torque having opposite signs.

If a magnitude of the motor torque is below the threshold motor torque and, at the same time, a magnitude of the generator torque is below the threshold generator torque, the inverter is not able to detect a motor mode or a generator mode of operation. In this case, the inverter detects a torque-free state of the drive motor even if a low motor torque below the threshold motor torque or a low generator torque below the threshold generator torque is provided by the drive motor. This property of not being able to detect low motor torques or generator torques and instead detecting a torque-free state of the drive motor is typical of a number of inverters available on the market, especially some low-cost inverters.

Thus, in summary, the inverter is able to detect and distinguish three different operating states of the drive motor, namely a motor mode, a generator mode, and a torque-free state. Due to its design, the inverter is in particular not able to detect the level of a motor torque provided in motor mode and the level of a generator torque provided in generator mode.

Advantageously, the accelerator pedal is operable by an operator of the working machine, so that the drive motor is controlled via the inverter in such a way that it provides a motor speed and a motor torque which correspond to the position of the accelerator pedal. The relationship between a position of the accelerator pedal and a provided motor speed and a provided motor torque can be, for example, linear or even exponential. The relationship can be stored, for example, in the form of a mathematical formula or a characteristic curve in an electronic control unit, which reads the position of the accelerator pedal and causes the inverter to control the drive motor according to the position.

According to the present disclosure, it is now provided that each position of the accelerator pedal is assigned a respective maximum motor speed, and that a motor fault is detected when a motor speed above an assigned speed is detected and, at the same time, a motor mode of the drive motor is detected.

A motor fault is understood to mean a malfunction in the control of the drive motor, which does not necessarily have to be due to the mechanical or electrical properties of the drive motor, but can also be caused by a fault in the inverter or a fault in a control unit.

It is thus advantageously made possible to provide a safety function in the form of an error detection function which always detects a malfunction in the control of the drive motor when the drive motor provides a torque even though the motor speed is already greater than a maximum motor speed assigned to the corresponding position of the accelerator pedal. In other words, a malfunction in the control of the drive motor is detected when the working machine has already reached or exceeded a speed assigned to the corresponding position of the accelerator pedal, but continues to accelerate. The motor speed can advantageously be determined via a speed sensor and independently of the inverter.

Thus, by suitably taking into account a maximum speed assigned to the respective position of the accelerator pedal, a malfunction in the control of the drive motor can be reliably detected despite the design-related inability of the inverter to detect a malfunction in the control of the drive motor.

A preferred embodiment of the present disclosure provides that each position of the accelerator pedal is assigned the respective maximum motor speed by means of a characteristic curve. The large number of possible positions of the accelerator pedal results in a corresponding large number of characteristic curves, so that each position of the accelerator pedal can advantageously be assigned the corresponding maximum motor speed also by a characteristic map. The maximum speed is the speed assigned to the position of the accelerator pedal at which, when exceeded, a motor fault is detected if a motor mode of operation is detected at the same time. In this connection, a continuous assignment of the position of the accelerator pedal to a motor speed can be accomplished in a relatively simple manner via a characteristic curve or a characteristic map.

Preferably, it is provided that the respective maximum motor speed assigned to each position of the accelerator pedal corresponds to a motor speed that the drive motor reaches during straight-ahead travel of the working machine on a flat surface without inclination, taking into account the respectively provided motor torque. Preferably, the respective maximum motor speed assigned to each position of the accelerator pedal can be 10% above a motor speed that the drive motor reaches during straight-ahead travel of the working machine on a flat surface without inclination, taking into account the respectively provided motor torque. Thus, for example, when traveling briefly or slightly downhill, a motor fault is not immediately detected when the motor speed increases briefly due to the downhill force acting on the working machine.

An embodiment of the present disclosure provides that the drive motor is stopped by the inverter when a motor fault is detected. "Stopping the motor" is understood to mean a state where the drive motor no longer generates any speed or torque. Thus, the drive motor can no longer present any danger.

An embodiment of the present disclosure provides that the drive motor is switched to a current-free state. Preferably, the drive motor is also switched to a voltage-free state. This means that no electrical currents flow through the coils of the drive motor anymore and no electrical voltages are present at the coils of the drive motor anymore.

An embodiment of the present disclosure provides that at least one drive wheel drivingly coupled to the electric drive motor is driven by the drive motor, the motor speed being determined based on a measured wheel speed. Since a speed sensor is usually associated with the drive wheels of a working machine anyway, the speed of at least one wheel can therefore also be measured. Via the known gear ratios in the drive train from the drive motor to the drive wheel, it is thus possible to calculate back to the speed of the drive motor.

The present disclosure further relates to an electrified drive train for a working machine, including an electric drive motor, an inverter associated with the electric drive motor, and an accelerator pedal; the drive train being designed such that the drive motor provides a motor speed and a motor torque according to a position of the accelerator pedal; the drive train being designed such that the inverter detects a motor mode of the drive motor when the drive motor provides a motor torque greater than a threshold motor torque; the drive train being designed such that the inverter detects a generator mode of the drive motor when the drive motor provides a generator torque greater than a threshold generator torque; and the drive train being designed such that the inverter detects a torque-free state of the drive motor when the generator torque is less than the threshold generator torque and the motor torque is less than the threshold motor torque. The drive train according to the present disclosure is characterized in that the drive train is designed to assign each position of the accelerator pedal a respective maximum motor speed and to detect a motor fault when the inverter detects a motor speed that is above an assigned speed and at the same time detects a motor mode of the drive motor.

Thus, the advantages already described in connection with the method according to the present disclosure are also obtained for the drive train according to the present disclosure.

The electrified drive train according to the present disclosure includes all means and devices for implementing the method according to the present disclosure.

Finally, the present disclosure also relates to a working machine including a drive train according to the present disclosure. Thus, the advantages already described in connection with the drive train according to the present disclosure are also obtained for the working machine according to the present disclosure.

The working machine is preferably a wheel loader, but can also be a compact loader, a telescopic loader, a dumper, a digger, or a tractor.

Embodiments of the present disclosure will be explained in more detail below with reference to exemplary embodiments illustrated in the figures.

Like objects, functional units, and comparable components are denoted by like reference numerals throughout the figures. These objects, functional units, and comparable components are designed to be identical in terms of their technical features, unless the description explicitly or implicitly indicates otherwise.

FIG. 1 schematically shows, on a torque axis 10, the generator torque 11 of the drive motor, the motor torque 12 of the drive motor, as well as the threshold generator torque 13 and the threshold motor torque 14. Due to the specific design of the inverter used by way of example, this inverter is unable to precisely detect a torque-free state of the drive motor, i.e., a motor torque 12 or a generator torque 11 of zero. Conversely, the inverter cannot detect a motor torque 12 until threshold motor torque 14 is exceeded and, analogously, it cannot detect a generator torque 11 until threshold generator torque 13 is exceeded. Thus, accordingly, the inverter always detects a torque-free state of the drive motor when the motor torque 12 provided by the drive motor is lower than threshold motor torque 14 or when the generator torque 11 provided by the drive motor is lower than threshold generator torque 13.

Figure 2:
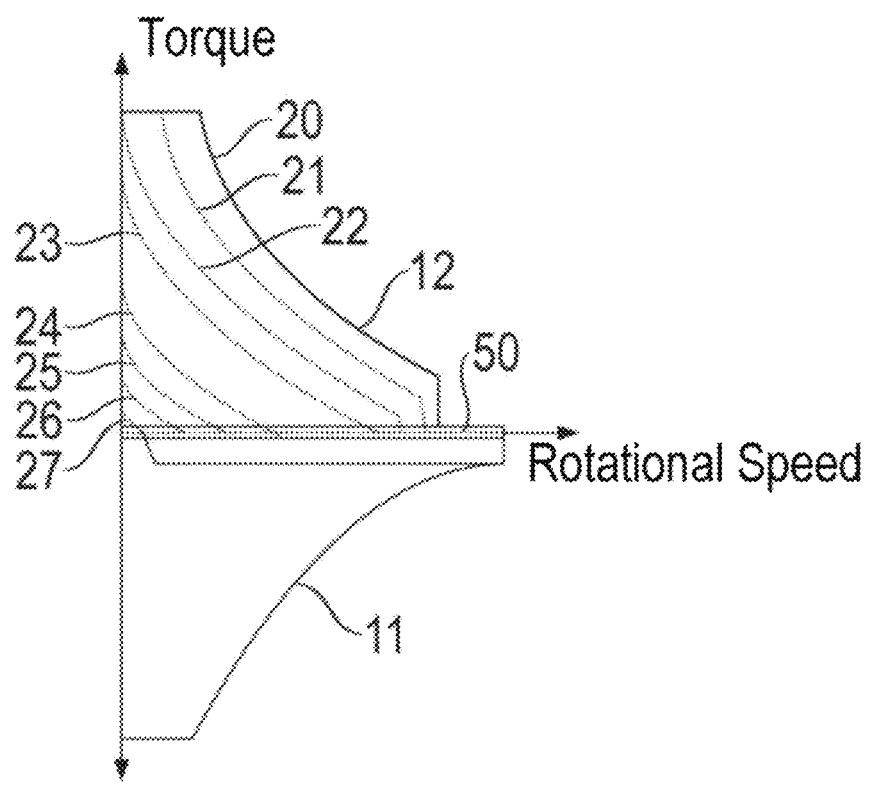
FIG. 2 illustrates a maximum motor torque and a maximum generator torque, each as a function of a motor speed of the drive motor.

FIG. 2 shows a maximum motor torque 12 and a maximum generator torque 11, each as a function of a motor speed of the drive motor. As can be seen, maximum motor torque 12 and maximum generator torque 11 decrease with increasing motor speed, which is typical behavior for electric motors.

Each of the characteristic curves 20, 21, 22, 23, 24, 25, 26, 27 shows motor torque 12 against the motor speed for a particular accelerator pedal position. Characteristic curve 20 shows generator torque 11 in generator mode against the motor speed. Range 50 describes, by way of example, a range in which motor torque 12 and generator torque 11 are less than threshold motor torque 14 or threshold generator torque 13, respectively, so that here the inverter detects a standstill of the drive motor.

FIG. 3a shows a series of maximum motor torques 12 as characteristic curves 20, 21, 22, 23, 24, 25, 26, 27, 28 as a function of a motor speed of the drive motor for different accelerator pedal positions. The accelerator pedal positions are indicated by an arrow 40. In this respect, FIG. 3a represents a portion of FIG. 2. As can also be seen, each characteristic curve 20, 21, 22, 23, 24, 25, 26, 27, 28 is assigned a maximum motor speed at which motor torque 12 becomes zero. This maximum motor speed is marked by a red circle in each case.

A characteristic curve 30, as shown in FIG. 3b, can be generated from the accelerator pedal position-dependent speeds determined in this way. The characteristic curve assigns a maximum motor speed to each position of the accelerator pedal. Thus, based on characteristic curve 30, a motor fault can be detected by detecting, for a current accelerator pedal position, a motor speed that is above a speed assigned by characteristic curve 30 and, at the same time, detecting a motor mode of the drive motor.

FIG. 4 shows, in the form of a flow diagram, an embodiment of the method according to the present disclosure for operating an electrified drive train for a working machine. The drive train includes an electric drive motor, an inverter associated with the electric drive motor, and an accelerator pedal.

In a first method step 100, the drive motor provides a motor speed and a motor torque according to a position of the accelerator pedal.

Then, in step 101, a motor mode of the drive motor is detected by the inverter when a motor torque 12 greater than a threshold motor torque 14 is provided. Otherwise, in step 102, a generator mode of the drive motor is detected by the inverter when a generator torque 11 greater than a threshold generator torque 13 is provided. If neither a motor mode nor a generator mode is detected, a torque-free state of the drive motor is detected by the inverter in step 103 since generator torque 11 is less than threshold generator torque 13 and motor torque 12 is less than the threshold motor torque 14.

If a motor mode was detected in step 101, the method continues in step 104.

In this subsequent step 104, a speed of a drive wheel of the working machine that is driven by the drive motor is measured. The speed of the drive wheel is used, for example, to calculate the speed of the drive motor in step 105, using the known gear ratio between a motor shaft of the drive motor and the drive wheel.

In step 106, the calculated speed is used to determine, via a characteristic curve 30, a maximum drive motor speed corresponding to the accelerator pedal position as a function of a current accelerator pedal position.

If it is detected in step 107 that the speed of the drive motor is below the maximum speed corresponding to the accelerator pedal position, which is defined by characteristic curve 30, the method begins again in step 100.

However, if it is detected in step 108 that the speed of the drive motor is above the maximum speed corresponding to the accelerator pedal position, which is defined by characteristic curve 30, it is checked in step 109 whether the drive motor is currently providing a motor torque 12.

If no motor torque 12 is provided, the method begins again in step 100.

However, if it is determined that a motor torque 12 is being provided, a motor fault is detected in step 110. The drive motor is stopped in step 111 by switching it to a current-free and voltage-free state.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 10 torque axis
11 generator torque
12 motor torque
13 threshold generator torque
14 threshold motor torque
20 motor torque/motor speed characteristic curve
21 motor torque/motor speed characteristic curve
22 motor torque/motor speed characteristic curve
23 motor torque/motor speed characteristic curve
24 motor torque/motor speed characteristic curve 24
25 motor torque/motor speed characteristic curve
26 motor torque/motor speed characteristic curve
27 motor torque/motor speed characteristic curve
28 motor torque/motor speed characteristic curve
30 accelerator pedal position/speed characteristic curve
40 arrow, accelerator pedal position
50 range in which a standstill of the drive motor is detected
100 providing a motor torque
101 detecting a motor mode of operation
102 detecting a generator mode of operation
103 detecting a standstill
104 measuring a speed of a drive wheel
105 calculating a speed of the drive motor
106 determining the maximum speed according to the accelerator pedal position
107 detecting that the speed is below the maximum speed
108 detecting that the speed is above the maximum speed
109 checking whether a motor torque is being provided
110 detecting a motor fault
111 stopping the drive motor

The invention claimed is:

1. A method for operating an electrified drive train for a working machine; the drive train including an electric drive motor, an inverter associated with the electric drive motor, and an accelerator pedal; the drive motor providing a motor speed and a motor torque according to a position of the accelerator pedal; the inverter detecting a motor mode of the drive motor when a motor torque greater than a threshold motor torque is provided; the inverter detecting a generator mode of the drive motor when a generator torque greater than a threshold generator torque is provided; and the inverter detecting a torque-free state of the drive motor when the generator torque is less than the threshold generator torque and the motor torque is less than the threshold motor torque,
wherein each position of the accelerator pedal is assigned a respective maximum motor speed, and in that a motor fault is detected when a motor speed above an assigned speed is detected and, at the same time, a motor mode of the drive motor is detected.

2. The method as recited claim 1,
wherein each position of the accelerator pedal is assigned the respective maximum motor speed by means of a characteristic curve.

3. The method as recited in claim 1,
wherein the drive motor is stopped by the inverter when a motor fault is detected.

4. The method as recited in claim 3,
wherein the drive motor is switched to a current-free state.

5. The method as recited in claim 1,
wherein at least one drive wheel drivingly coupled to the electric drive motor is driven by the drive motor, the motor speed being determined based on a measured wheel speed.

6. An electrified drive train for a working machine, comprising an electric drive motor, an inverter associated with the electric drive motor, and an accelerator pedal; the drive train being designed such that the drive motor provides a motor speed and a motor torque according to a position of the accelerator pedal; the drive train being designed such that the inverter detects a motor mode of the drive motor when the drive motor provides a motor torque greater than a threshold motor torque; the drive train being designed such that the inverter detects a generator mode of the drive motor when the drive motor provides a motor torque greater than a threshold generator torque; and the drive train being designed such that the inverter detects a torque-free state of the drive motor when the generator torque is less than the threshold generator torque and the motor torque is less than the threshold motor torque, wherein the drive train is designed to assign each position of the accelerator pedal a respective maximum motor speed and to detect a motor fault when the inverter detects a motor speed that is above an assigned speed and at the same time detects a motor mode of the drive motor.

7. A working machine comprising the drive train according to claim 6.

* * * * *